United States Patent
Bates et al.

(10) Patent No.: US 8,103,950 B2
(45) Date of Patent: *Jan. 24, 2012

(54) STRUCTURE AND METHOD FOR LINKING WITHIN A WEBSITE

(75) Inventors: Cary L. Bates, Rochester, MN (US);
Gilford F. Martino, Endwell, NY (US);
John M. Santosuosso, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 1243 days.

This patent is subject to a terminal disclaimer.

(21) Appl. No.: 11/768,402

(22) Filed: Jun. 26, 2007

(65) Prior Publication Data

US 2007/0250763 A1   Oct. 25, 2007

Related U.S. Application Data

(62) Division of application No. 10/061,259, filed on Jan. 31, 2002, now Pat. No. 7,284,195.

(51) Int. Cl.
*G06F 17/00* (2006.01)

(52) U.S. Cl. ........ 715/206; 715/200; 715/205; 715/207; 715/208

(58) Field of Classification Search .......... 715/200, 715/205, 206, 207, 208
See application file for complete search history.

(56) References Cited

U.S. PATENT DOCUMENTS

| | | |
|---|---|---|
| 5,727,129 A | 3/1998 | Barrett et al. |
| 5,796,952 A | 8/1998 | Davis et al. |
| 5,890,172 A | 3/1999 | Borman et al. |
| 5,937,163 A | 8/1999 | Lee et al. |
| 5,960,429 A | 9/1999 | Peercy et al. |
| 6,049,835 A | 4/2000 | Gagnon |
| 6,055,569 A | 4/2000 | O'Brien et al. |
| 6,076,166 A | 6/2000 | Moshfeghi et al. |
| 6,088,032 A | 7/2000 | Mackinlay |
| 6,122,647 A * | 9/2000 | Horowitz et al. ............ 715/205 |
| 6,138,155 A | 10/2000 | Davis et al. |
| 6,177,936 B1 | 1/2001 | Cragun |
| 6,182,133 B1 | 1/2001 | Horvitz |
| 6,189,018 B1 | 2/2001 | Newman et al. |
| 6,189,019 B1 | 2/2001 | Blumer et al. |
| 6,189,024 B1 | 2/2001 | Bauersfeld et al. |
| 6,195,679 B1 | 2/2001 | Bauersfeld et al. |
| 6,226,655 B1 * | 5/2001 | Borman et al. ............ 715/207 |
| 6,243,091 B1 * | 6/2001 | Berstis .................... 715/205 |
| 6,268,856 B1 | 7/2001 | Bruck et al. |
| 6,449,765 B1 * | 9/2002 | Ballard .................... 717/174 |
| 6,772,139 B1 * | 8/2004 | Smith, III ................ 707/748 |
| 6,820,111 B1 | 11/2004 | Rubin et al. |
| 6,865,719 B1 | 3/2005 | Nicholas, III |
| 6,871,213 B1 | 3/2005 | Graham et al. |

(Continued)

*Primary Examiner* — Chau Nguyen
(74) *Attorney, Agent, or Firm* — Schmeiser, Olsen & Watts

(57) ABSTRACT

A link structure and method for linking therein. The link structure includes a first page of a website and may include a global page of the website. The first page includes a link that has a default pointer and may have a local pointer, a global pointer, or both. The local pointer points to a local page and the global pointer points to the global page. A local link structure includes the local pointer but not the global pointer. A global link structure includes the global pointer but not the local pointer. A hybrid link structure includes the local pointer and the global pointer. Linking within the link structure may include linking from the link to the local page through the local pointer or linking from the link to the global page through the global pointer.

27 Claims, 10 Drawing Sheets

U.S. PATENT DOCUMENTS

| | | |
|---|---|---|
| 6,925,496 B1 | 8/2005 | Ingram et al. |
| 6,983,282 B2 * | 1/2006 | Stern et al. ............... 707/805 |
| 6,993,531 B1 * | 1/2006 | Naas ............... 715/234 |
| 7,213,198 B1 * | 5/2007 | Harik ............... 715/234 |
| 7,249,315 B2 * | 7/2007 | Moetteli ............... 715/234 |
| 7,284,195 B2 | 10/2007 | Bates et al. |
| 2002/0059335 A1 * | 5/2002 | Jelbert ............... 707/500 |
| 2004/0059732 A1 | 3/2004 | Vaucher |
| 2004/0205502 A1 * | 10/2004 | Baird ............... 715/501.1 |

* cited by examiner

STRUCTURE AND METHOD FOR LINKING WITHIN A WEBSITE

This application is a divisional of Ser. No. 10/061,259, filed Jan. 31, 2002, now U.S. Pat. No. 7,284,195, issued Oct. 16, 2007.

BACKGROUND OF THE INVENTION

1. Technical Field

The present invention relates to Internet website link structures for efficiently linking to pages of the website.

2. Related Art

FIG. 1 is a block diagram of a default link structure 10 associated with an Internet website, in accordance with the related art. The default website link structure 10 includes web pages 12-22 and links 25-37. Page 12 includes links 25-26, page 13 includes links 27-28, page 14 includes links 29-31, page 15 includes link 32, page 16 includes links 33-34, and page 17 includes links 35-37. Pages 18-22 have no links. The links 25-37 include pointers 25D-37D, respectively. If a first page is displayed to a user on a screen display of a computer monitor, then a "link" is defined as a portion of the first page such that if the link is "triggered" such as by single left-clicking a mouse when the cursor is on said portion of the first page, then a "default page" replaces the first page as displayed to the user on the screen display. The default page has been predefined for the link; i.e., each link has its own predefined default page which will be displayed as a result of a triggering of the link. The link's pointer points to the default page. A "pointer" from the first page to the default page identifies the default page and/or the location of the default page, so that the underlying browser or other software can display the default page to the user.

Each link has exactly one pointer (called a "default pointer"). As an example, the link 28 of page 13 has (i.e., comprises or includes) a default pointer 28D and a default page 16, wherein the default pointer 28D points to the default page 16. Thus, if a screen cursor is on link 28 of page 13 and if the user triggers link 28 of page 13, then the default page 16 replaces page 13 as displayed to the user on the screen display. Similarly, the link 25 of page 12 has a default pointer 25D that points to default page 13, the link 26 of page 12 has a default pointer 26D that points to default page 14, the link 27 of page 13 has a default pointer 27D that points to default page 15, the link 28 of page 13 has a default pointer 28D that points to default page 16, the link 29 of page 14 has a default pointer 29D that points to default page 16, the link 30 of page 14 has a default pointer 30D that points to default page 16, the link 31 of page 14 has a default pointer 31D that points to default page 17, the link 32 of page 15 has a default pointer 32D that points to default page 18, the link 33 of page 16 has a default pointer 33D that points to default page 19, the link 34 of page 16 has a default pointer 34D that points to default page 20, the link 35 of page 17 has a default pointer 35D that points to default page 21, the link 36 of page 17 has a default pointer 36D that points to default page 21, and the link 37 of page 17 has a default pointer 37D that points to default page 22. A given page may have one or more links, or no links at all (see, e.g., page 17 having three links 35-37, page 15 having the one link 32, and page 19 having no links). A given page may be a default page of one or more links (see, e.g., page 16 pointed to by three links 28-30); i.e., the given page may be pointed to by one or more pointers.

Most Internet websites have multiple pages and when a user visits a given website, the user is interested in at least several web pages of the given website. As the user revisits the given website several times, the user becomes very familiar with the layout of the given website and knows exactly what web pages the user wants to read or doesn't want to read. Unfortunately, the user is probably unable to efficiently access the web pages of interest. While the user could bookmark the web pages of interest, a large amount of bookmarking becomes unmanageable. Thus, the user may inefficiently navigate through the web pages of the given website, which increases web traffic and contributes to undesirable delays that the user experiences. Accordingly, there is a need for a method and system to enable the user to more efficiently navigate through web pages of Internet website.

SUMMARY OF THE INVENTION

In a first embodiment, the present invention provides a local link structure, comprising:
a first local page of a first website; and
a first page of the first website, wherein the first page includes a first link, wherein the first link includes a first default pointer and a first local pointer, wherein the first default pointer points to a first default page, and wherein the first local pointer points to the first local page.

In a second embodiment, the present invention provides a global link structure, comprising:
a global page of a first website; and
a first page of the first website, wherein the first page includes a first link, wherein the first link includes a first default pointer and a first global pointer, wherein the first default pointer points to a first default page, and wherein the first global pointer points to the global page.

In a third embodiment, the present invention provides a hybrid link structure, comprising:
a global page of a first website; and
a first page of the first website, wherein the first page includes a first link, wherein the first link includes a first default pointer, a first local pointer, and a first global pointer, wherein the first default pointer points to a first default page, wherein the first local pointer points to a first local page of the first website, and wherein the first global pointer points to the global page.

In a fourth embodiment, the present invention provides a method for linking within a website, comprising:
providing a local link structure, wherein the local link structure comprises a first page of the website, wherein the first page includes a first link, wherein the first link includes a first default pointer and a first local pointer, wherein the first default pointer points to a first default page, and wherein the first local pointer points to a first local page of the website; and
linking from the first link to the first local page through the first local pointer.

In a fifth embodiment, the present invention provides a method for linking within a website, comprising:
providing a global link structure, wherein the global link structure includes a global page of the website and a first page of the website, wherein the first page includes a first link, wherein the first link includes a first default pointer and a first global pointer, wherein the first default pointer points to a first default page, and wherein the first global pointer points to the global page; and
linking from the first link to the global page through the first global pointer.

In a sixth embodiment, the present invention provides a method for linking within a website, comprising:
providing a hybrid link structure, wherein the hybrid link structure comprises a global page of the website and a first page of the website, wherein the first page includes a first link, wherein the first link includes a first default pointer, a first local pointer, and a first global pointer, wherein the first default pointer points to a first default page, wherein the first local pointer points to a first local page of the website, wherein the first global pointer points to the global page; and first linking selected from the group consisting of linking from the first link to the first local page through the first local pointer and linking from the first link to the global page through the first global pointer.

In a seventh embodiment, the present invention provides a method for generating a local link structure, comprising:

navigating to a first page of a website;

moving a cursor to a link on the first page, wherein the link on the first page includes a default pointer to a default page;

generating a local pointer at the link on the first page;

navigating to a second page of the website; and designating the second page as a local page pointed to by the local pointer.

In a eighth embodiment, the present invention provides a method for generating a global link structure, comprising:

navigating to a first page of the website;

moving a cursor to a link on the first page, wherein the link on the first page includes a first default pointer to a first default page;

navigating to a desired page of the website;

designating the desired page as the global page of the website;

navigating to the first page of the website;

generating a first global pointer to the global page at the link on the first page;

navigating to a second page of the website;

moving the cursor to a link on the second page, wherein the link on the second page includes a second default pointer to a second default page; and generating a second global pointer to the global page at the link on the second page.

The present invention provides a method and system to enable the user to efficiently navigate through web pages of a given Internet website.

DETAILED DESCRIPTION OF THE INVENTION

If a first page is displayed to a user on a display screen (e.g., on a display screen of a computer monitor), then a "link" is defined as a portion of the first page such that if the link is "triggered" such as by multiple left-clicking a mouse when a screen cursor is on the link (i.e., said portion of the first page), then a second page replaces the first page as displayed to the user on the screen display. When the link is triggered, "linking" is said to have occurred from the link to the second page through a pointer that points to the second page from the link. "Triggering" may be implemented in any way known in the art, such as by double left-clicking a mouse, double right-clicking a mouse, triple-clicking a mouse, pressing keys of a keyboard according to a prescribed key pressing instruction (e.g., ALT-3), etc.

Figure 3:
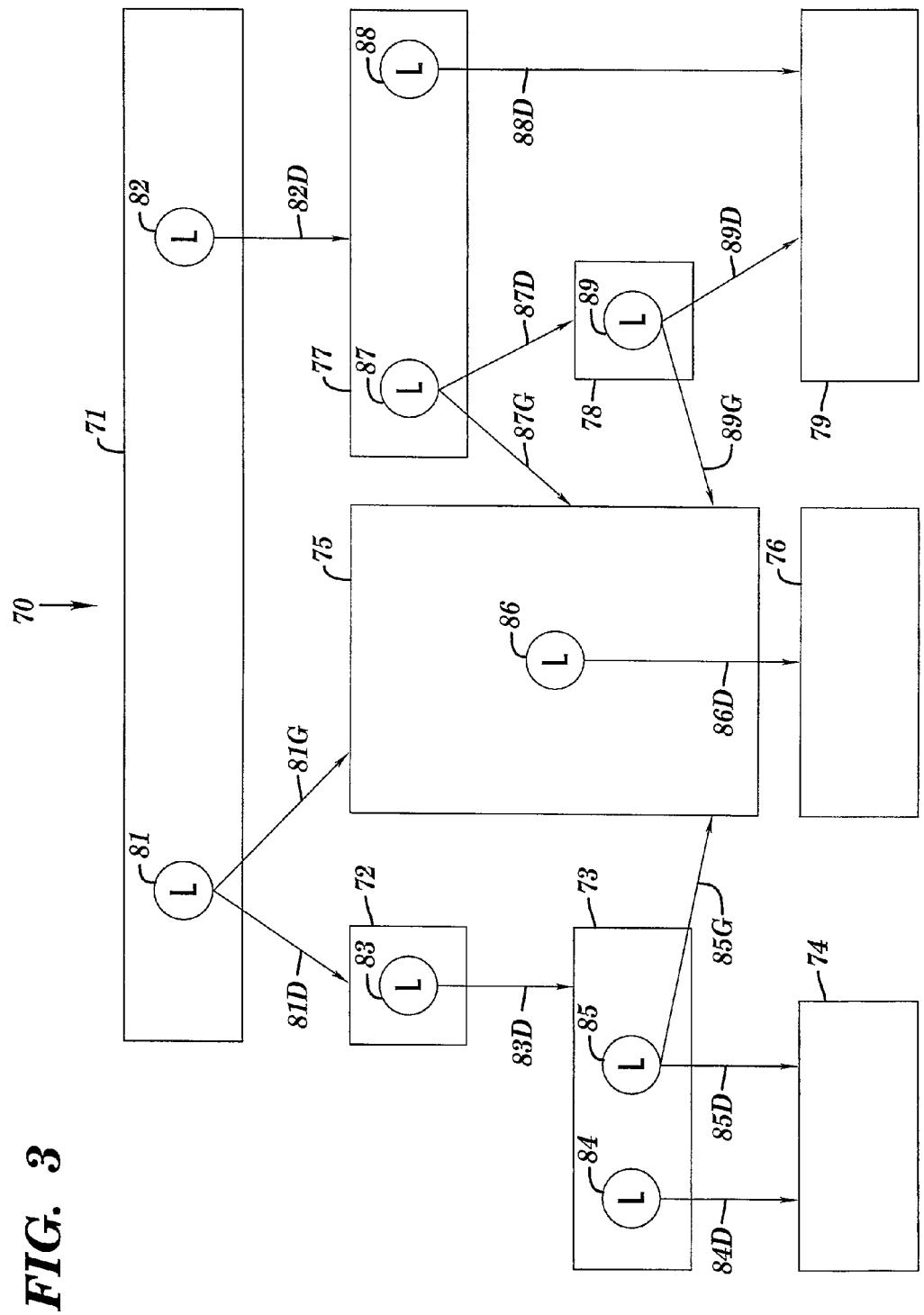
FIG. 3 is a block diagram of a global link structure having global pointers, in accordance with embodiments of the present invention.
Figure 4:
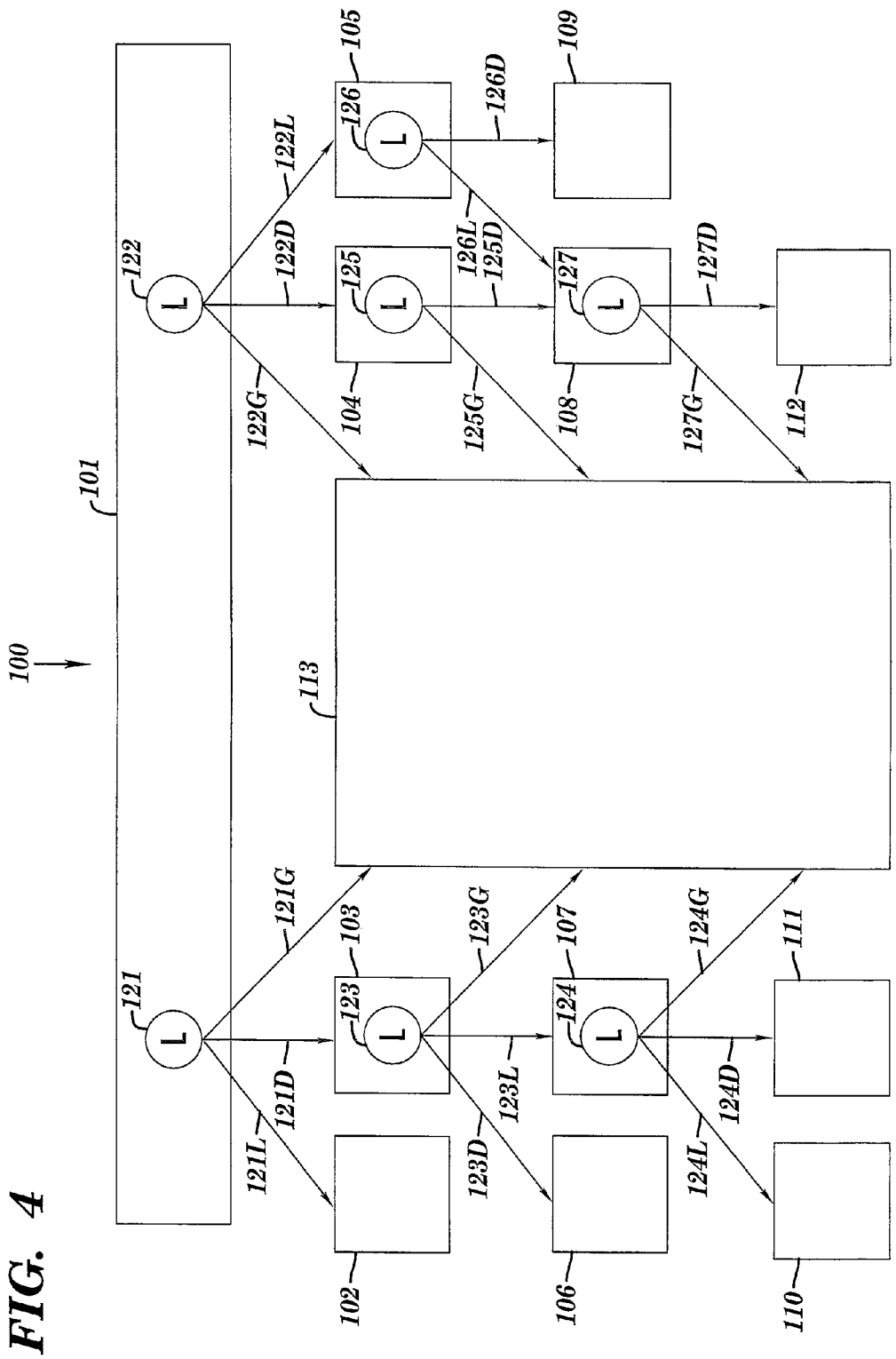
FIG. 4 is a block diagram of a hybrid link structure having local pointers and global pointers, in accordance with embodiments of the present invention.

The present invention includes various types of link structures, including a local link structure, a global link structure, and a hybrid link structure. With a local link structure, a link may have a local pointer pointing to a local page. With a global link structure, a link may have a global pointer pointing to a global page. With a hybrid link structure, a link may have a local pointer pointing to a local page and a global pointer pointing to a global page. The local link structure, global link structure, and hybrid link structure is illustrated in FIG. 2, FIG. 3, and FIG. 4, respectfully.

Figure 1:
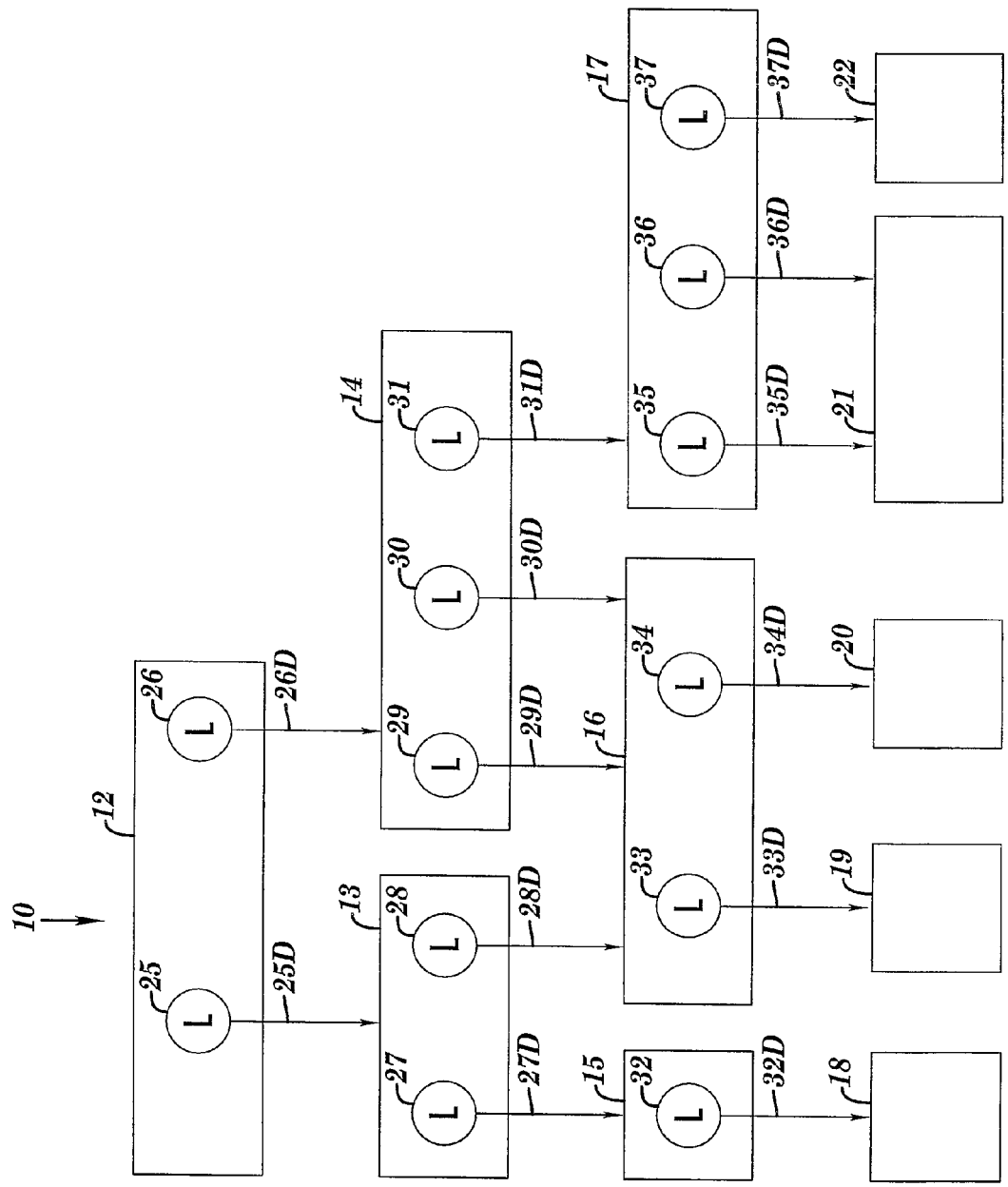
FIG. 1 is a block diagram of a link structure having default pointers, in accordance with the related art.
Figure 2:
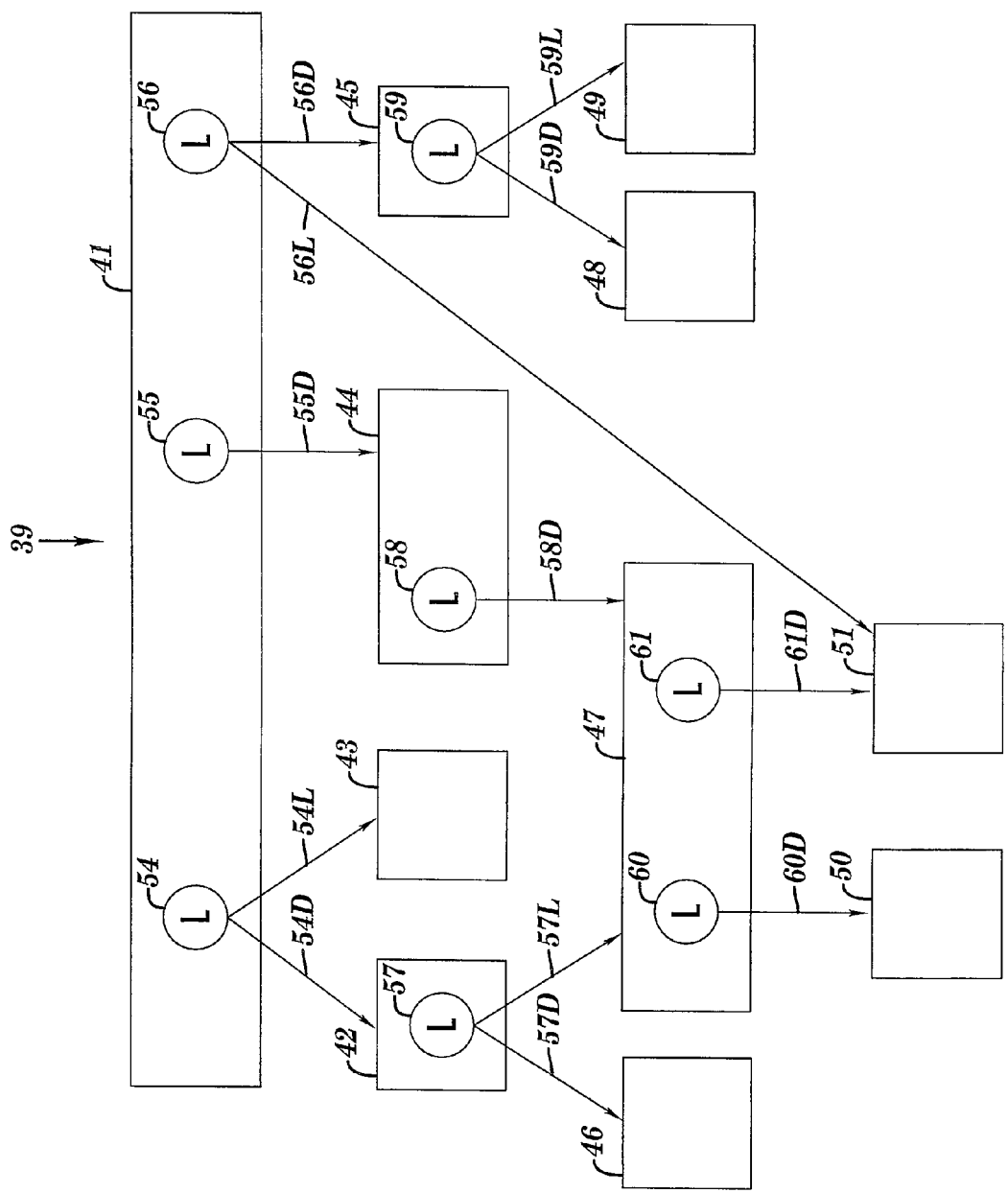
FIG. 2 is a block diagram of a local link structure having local pointers, in accordance with embodiments of the present invention.

FIG. 2 is a block diagram of a local link structure 39 of a website (e.g., an Internet website), in accordance with embodiments of the present invention. The local link structure 39 includes web pages 41-51 and links 54-61. Page 41 includes links 54-56, page 42 includes link 42, page 44 includes link 58, page 45 includes link 59, and page 47 includes links 60-61. Pages 43, 46, and 48-51 have no links. The links 54-61 include default pointers 54D-61D, respectively, and local pointers as shown. Link 54 has default pointer 54D that points to default page 42 and a local pointer 54L that points to local page 43. Definitionally, link 54 is said to comprise or include the default page 42 and the local page 43. Link 55 has default pointer 55D that points to default page 44. Link 56 has default pointer 56D that points to default page 45 and a local pointer 56L that points to local page 51. Link 57 has default pointer 57D that points to default page 46 and a local pointer 57L that points to local page 47. Link 58 has default pointer 58D that points to default page 47. Link 59 has default pointer 59D that points to default page 48 and a local pointer 59L that points to local page 49. Link 60 has default pointer 60D that points to default page 50. Link 61 has default pointer 61D that points to default page 51.

While all links of the local link structure 39 have a default pointer and associated default page, each link may or may not have a local pointer and associated local page. The default page of each link traditionally exists in the related art. The local page of a link (if said local page exists for the link) of the present invention provides a linking alternative for the user. If the user triggers a link in a way that is associated with a default link (e.g., single left clicking a mouse), then the default page is displayed to the user. If the user triggers the link in a special pre-defined way (e.g., triple-clicking a mouse or depressing certain keys of a keyboard such as CTRL-1), then the local page is displayed to the user. Thus, a local page provides an alternative to the default page for the user. Accordingly, if the user has the screen cursor on a link, and if the link comprises both a default page and a local page, then the user may trigger either the default link to link to the default page or trigger the local link to link to the local page. Use of a local page may avoid substantial navigation and avoid disadvantages of the related art. For example, if a user on page 41 desires to bring page 51 on the screen, then the user could use conventional default linking by navigating from link 55 of page 41 to link 58 of page 44, then to link 61 of page 47, and then to page 51. However, link 56 of page 41 points directly to local page 51 so that the user could directly link to page 51 from page 11 by triggering the local pointer 56L to page 51. Thus, the local pages of the present invention enable the user to more efficiently navigate through web pages of a given website.

If a given link of a local link structure comprises a local page, then the default page of the given link is a page of the website that comprises the given link. If a given link does not comprise a local page, then the default page of the given link may be either a page of the website that comprises the given link, or a page of any other website.

Given the local link structure 39 of a website, the user may engage in linking from a first link of a first page of the website to a first local page through a first local pointer that points from the first link to the first local page. Then the user may navigate to a second link (i.e., the user may navigate to a page that includes the second link and then move the screen cursor to the second link), followed by linking from the second link to a second local page through a second local pointer that points from the second link to the second local page. The second link may be comprised by the first page or by any other page of the website. The linking may comprise any method of linking known to a person of ordinary skill in the art, such as by clicking a mouse (e.g., multiply clicking the mouse via left, middle or right clicking) when a screen cursor is located on the relevant link.

FIG. 3 is a block diagram of a global link structure 70, in accordance with embodiments of the present invention. The global link structure 70 includes web pages 71-79 and links 81-89. Page 71 includes links 81-82, page 72 includes link 83, page 73 includes links 84-85, page 75 includes link 86, page 77 includes links 87-88, and page 78 includes link 89. Pages 74, 76, and 79 have no links. The links 81-89 include default pointers 81D-89D, respectively, and global pointers as shown. Link 81 has default pointer 81D that points to default page 72 and a global pointer 81G that points to global page 75. Definitionally, link 81 is said to comprise or include the default page 72 and the global page 75. Link 82 has default pointer 82D that points to default page 77. Link 83 has default pointer 83D that points to default page 73. Link 84 has default pointer 84D that points to default page 74. Link 85 has default pointer 85D that points to default page 74 and a global pointer 85G that points to global page 75. Link 86 has default pointer 86D that points to default page 76. Note that link 86 is within the global page 75. Link 87 has default pointer 87D that points to default page 78 and a global pointer 87G that points to global page 75. Link 88 has default pointer 88D that points to default page 79. Link 89 has default pointer 89D that points to default page 79 and a global pointer 89G that points to global page 75.

While all links of the global link structure 70 have a default pointer and associated default page, each link may or may not have a global pointer and associated global page. The default page of each link traditionally exists in the related art. The global page of a link (if said global page exists for the link) of the present invention provides a linking alternative for the user. If the user triggers a link in a way that is associated with a default link (e.g., single left clicking a mouse), then the default page is displayed to the user. If the user triggers the link in a special pre-defined way (e.g., triple-clicking a mouse or depressing certain keys of a keyboard such as ALT-1), then the global page is displayed to the user. Thus, a global page provides an alternative to the default page for the user. Accordingly, if the user has the screen cursor on a link, and if the link has both a default page and a global page, then the user may trigger either the default link or the global link. Use of a global page may avoid substantial navigation and avoid disadvantages of the related art. For example, if a user on page 71 desires to bring page 75 on the screen, then the user could use conventional default linking by navigating from link 81 of page 71 to link 83 of page 72, then to link 85 of page 73, and then to page 75. However, link 81 of page 71 points directly to the global page 75 so that the user could directly link to page 75 from link 81 of page 71 by triggering the global pointer 81G to page 75. Thus, the global pages of the present invention enable the user to more efficiently navigate through web pages of a given website.

If a given link of a global link structure comprises a global page, then the default page of the given link is a page of the website that comprises the given link. If a given link does not comprise a global page, then the default page of the given link may be either a page of the website that comprises the given link, or a page of any other website.

Given the global link structure 70 of a website, the user may engage in linking from a first link of a first page of a website to the global page through a first global pointer that points from the first link to the global page. Then the user may navigate to a second link, followed by linking from the second link to the global page through a second global pointer that points from the second link to the global page. The second link may be comprised by the first page or by any other page of the website. The linking may comprise any method of linking known to a person of ordinary skill in the art, such as by multiple clicking of a mouse when a screen cursor is located on the relevant link.

A local link structure (e.g., the local link structure 39 of FIG. 2) differs from a global link structure (e.g., the global link structure 70 of FIG. 3). In a local link structure, a first local page pointed to from a first link is independent of a second local page pointed to from a second link. Thus a local link structure may have one or more local pages even though it is possible for two links to point to corresponding local pages that may be different pages or the same page. For example, in FIG. 2 the link 59 on page 45 comprises (i.e., points to) the local page 49 and the link 57 on page 42 comprises the local page 47, but the link 56 on page 41 and the link 61 on page 47 each comprise the same page 51 as their respective local page. In contrast, a global link structure has exactly one, and only one, global page to which all global pointers point. In contrast in FIG. 3, page 75 is the sole global page, and links 81, 85, 87, and 89 each comprise (i.e., point to) the global page 75.

FIG. 4 is a block diagram of a hybrid link structure 100, in accordance with embodiments of the present invention. A hybrid link structure comprises both local pointers and global pointers. The hybrid link structure 100 includes web pages 101-112 and links 121-127. Page 101 includes links 121-122, page 103 includes link 123, page 104 includes link 125, page 105 includes link 126, page 107 includes link 124, and page 108 includes link 127. Pages 102, 106, and 109-112 have no links. The links 121-127 include default pointers 121D-127D, respectively, as well as local pointers and global pointers as shown. Link 121 has default pointer 121D that points to default page 103, local pointer 121L that points to local page 102, and global pointer 121G that points to global page 113. Definitionally, link 121 is said to comprise or include the default page 103, the local page 102, and the global page 113. Link 122 has default pointer 122D that points to default page 125, local pointer 122L that points to local page 105, and global pointer 122G that points to global page 113. Link 123 has default pointer 123D that points to default page 106, local pointer 123L that points to local page 107, and global pointer 123G that points to global page 113. Link 124 has default pointer 124D that points to default page 111, local pointer 124L that points to local page 110, and global pointer 124G that points to global page 113. Link 125 has default pointer 125D that points to default page 108 and global pointer 125G that points to global page 113. Link 126 has default pointer 126D that points to default page 109 and local pointer 126L that points to local page 108. Link 127 has default pointer 127D that points to default page 112 and global pointer 127G that points to global page 113.

In the hybrid link structure 100 of FIG. 4, all local pages and associated local links have the same characteristics and features described supra for the local pages and associated local links of the local link structure 39 of FIG. 2. Also in the hybrid link structure 100 of FIG. 4, the global page 123 and the associated global links have the same characteristics and features described supra for the global page 75 and the associated global links of the global link structure 70 of FIG. 3. In the hybrid link structure 100 of FIG. 4: some links comprise a default page, a local page, and the global page 123 (e.g., the link 123 of page 103); some links comprise a default page and a local page but no global page 123 (e.g., the link 126 of page 105); some links comprise a default page and the global page 123 but no local page (e.g., the link 127 of page 108); and some links comprise a default page but no local page and no global page 123.

If a given link of a hybrid link structure comprises a local page or a global page, then the default page of the given link is a page of the website that comprises the given link. If a given link does not comprise a local page and does not comprise a global page, then the default page of the given link may be either a page of the website that comprises the given link, or a page of any other website.

Given the hybrid link structure 100 of a website, the user may engage in linking from a first link of a first page of a website: to a first local page through a first local pointer that points from the first link to the first local page, OR to the global page through a first global pointer that points from the first link to the global page. Then the user may navigate to a second link, followed by linking from the second link: to a second local page through a second local pointer that points from the second link to the second local page, OR to the global page through a second global pointer that points from the second link to the global page. The second link may be comprised by the first page or by any other page of the website. The linking may comprise any method of linking known to a person of ordinary skill in the art, such as by multiple clicking of a mouse when a screen cursor is located on the relevant link.

Figure 5:
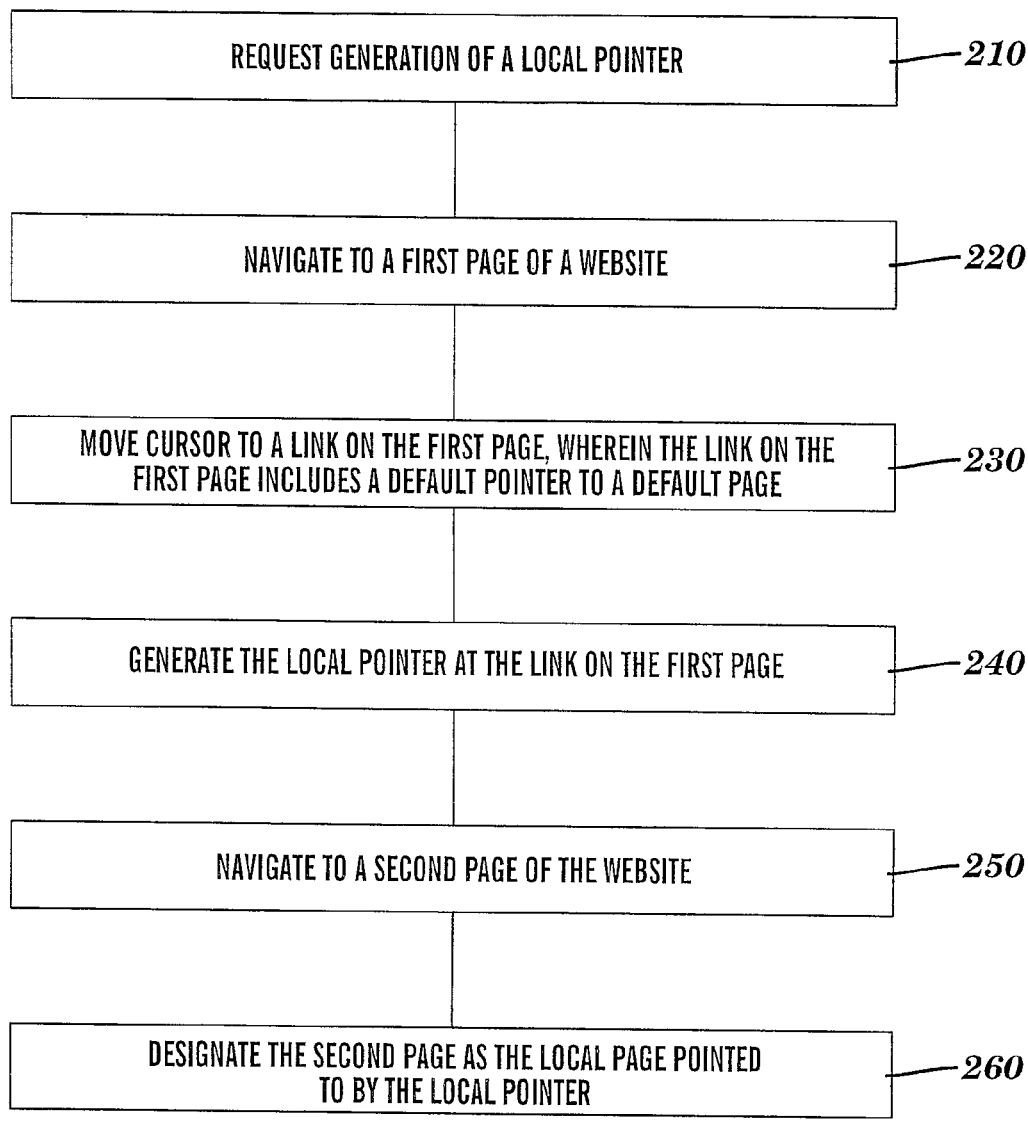
FIG. 5 is a first flow chart for generating a local pointer of a local link structure, in accordance with embodiments of the present invention.

FIG. 5 is a first flow chart for generating a local pointer of a local link structure, in accordance with embodiments of the present invention. The flow chart of FIG. 5 includes the steps of: requesting (210) generation of a local pointer; navigating (220) to a first page of a website; moving (230) a cursor to a link on the first page, wherein the link on the first page includes a default pointer; generating (240) the local pointer at the link on the first page; navigating (250) to a second page of the website; and designating (260) the second page as the local page pointed to by the local pointer.

Figure 6:
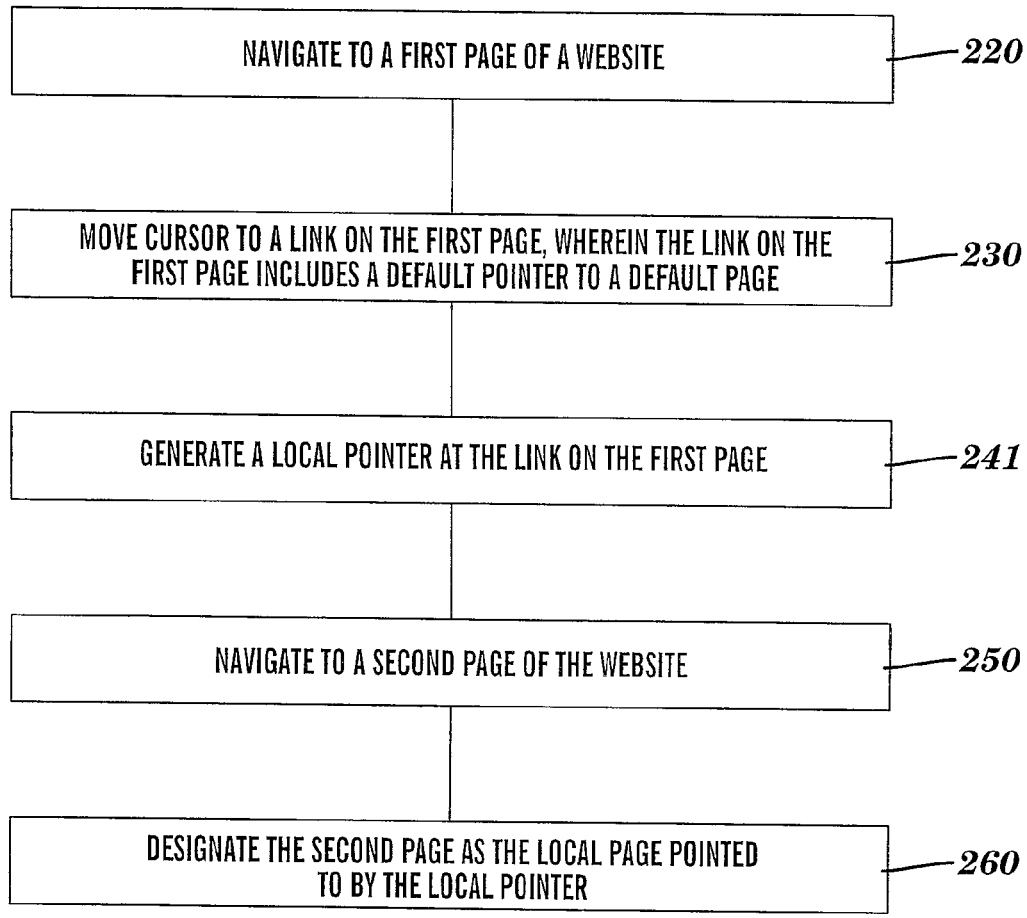
FIG. 6 is a second flow chart for generating a local pointer of a local link structure, in accordance with embodiments of the present invention.

FIG. 6 is a second flow chart for generating a local pointer of a local link structure, in accordance with embodiments of the present invention. The second flow chart of FIG. 6 is a variation of the first flow chart of FIG. 5, said variation eliminating step 210 of FIG. 5. Accordingly, the flow chart of FIG. 6 includes the steps of: navigating (220) to a first page of a website; moving (230) a cursor to a link on the first page, wherein the link on the first page includes a default pointer; generating (241) a local pointer at the link on the first page; navigating (250) to a second page of the website; and designating (260) the second page as the local page pointed to by the local pointer. Generally, the scope of the present invention includes any modification of the first flow chart of FIG. 5 that would be obvious to a person of ordinary skill in the art.

Figure 7:
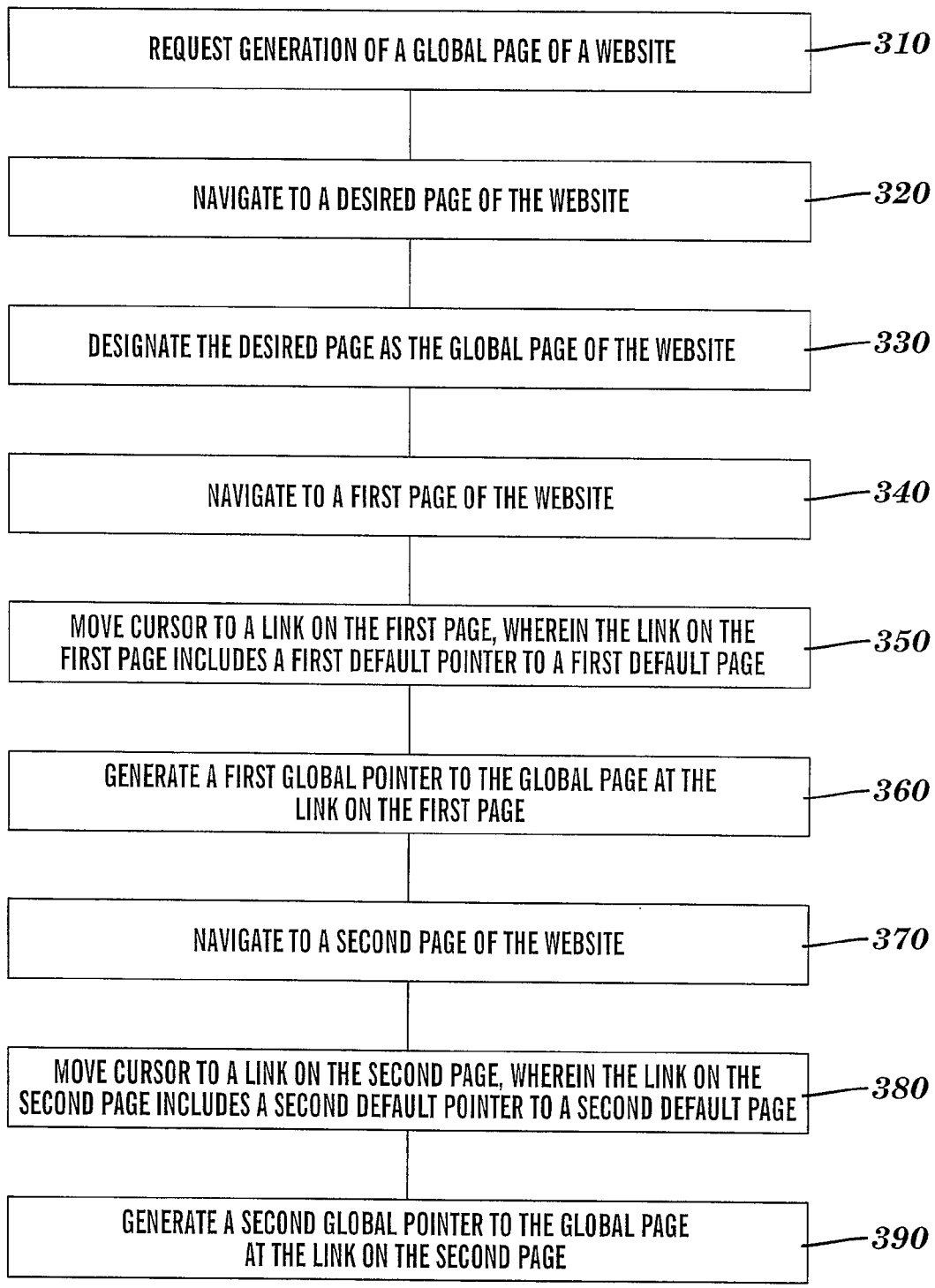
FIG. 7 is a first flow chart for generating a global pointer of a global link structure, in accordance with embodiments of the present invention.

FIG. 7 is a first flow chart for generating a global pointer of a global link structure, in accordance with embodiments of the present invention. The flow chart of FIG. 7 includes the steps of: requesting (310) generation of a global page of a website; navigating (320) to a desired page of the website; designating (330) the desired page as the global page of the website; navigating (340) to a first page of the website; moving (350) a cursor to a link on the first page, wherein the link on the first page includes a first default pointer; generating (360) a first global pointer to the global page at the link on the first page; navigating (370) to a second page of the website; moving (380) the cursor to a link on the second page, wherein the link on the second page includes a second default pointer; and generating (390) a second global pointer to the global page at the link on the second page.

Figure 8:
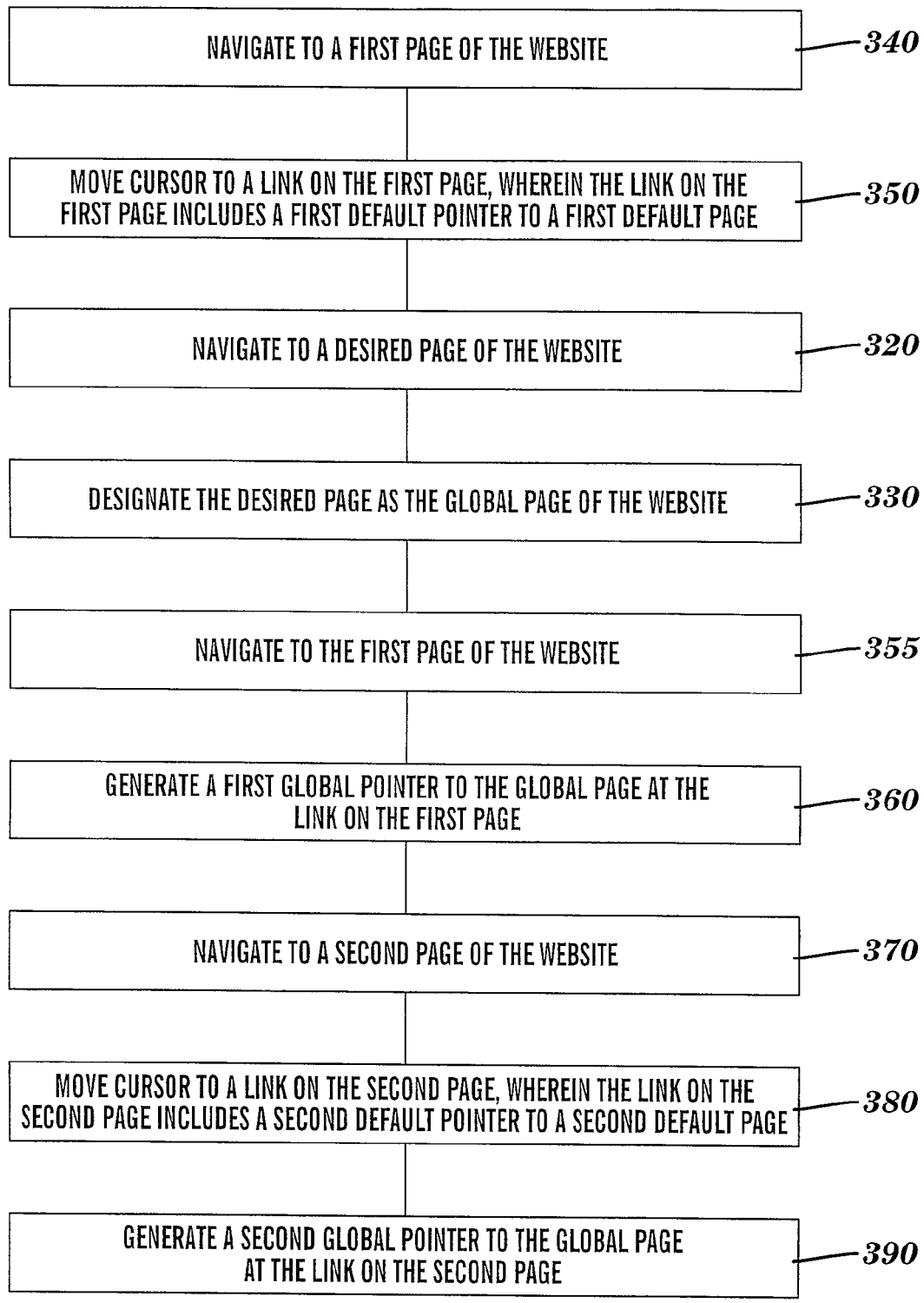
FIG. 8 is a second flow chart for generating a global pointer of a global link structure, in accordance with embodiments of the present invention.

FIG. 8 is a second flow chart for generating a global pointer of a global link structure, in accordance with embodiments of the present invention. The second flow chart of FIG. 8 is a variation of the first flow chart of FIG. 7. The flow chart of FIG. 8 includes the steps of: navigating (340) to a first page of the website; moving (350) a cursor to a link on the first page, wherein the link on the first page includes a first default pointer; navigating (320) to a desired page of the website; designating (330) the desired page as the global page of the website; navigating (355) to the first page of the website; generating (360) a first global pointer to the global page at the link on the first page; navigating (370) to a second page of the website; moving (380) the cursor to a link on the second page, wherein the link on the second page includes a second default pointer; and generating (390) a second global pointer to the global page at the link on the second page. Generally, the scope of the present invention includes any modification of the first flow chart of FIG. 7 that would be obvious to a person of ordinary skill in the art.

Selected steps in the flow charts of FIGS. 5-8, in which the user provides input to make choices or give commands, may be implemented in software by any method known to a person of ordinary skill in the art. In accordance with FIGS. 5-8, the present invention includes a computer program product, comprising a computer usable medium (e.g., a hard disk, a floppy disc, magnetic tape, etc.) having said software (e.g., a computer readable program code) embodied therein, said computer code having an algorithm for implementing a method of generating a global link structure (e.g., as described in FIGS. 5-6) or for generating a global link structure (e.g., as described in FIGS. 7-8).

Examples of said selected steps in the flow charts of FIGS. 5-8 comprise: steps 210 and 240 of FIG. 5; step 241 of FIG. 6; steps 310 and 330 of FIG. 7; and step 330 of FIG. 8. Examples of applicable methods for implementing such choices and commands include: selecting from pop-up menus; clicking on buttons; clicking on status bar (e.g., at bottom of web page); image or icon on web page such that when user moves the screen pointer over the image or icon, the pointer turns into a hand and text appears instructing the user what to do next; building in standard choices and commands into the web browser or other software being used; establishing standard choices and commands by use of historical frequency-of-use data for websites visited in the past by the user; command line inputting via keyboard entry of text, connection to another browser (i.e., other than the browser currently being used); etc. An example of using historical frequency-of-use data, for websites visited in the past by at least one user of said websites, is using such historical frequency-of-use data for determining the second page of the website in relation to step 250 of FIGS. 5 and 6, wherein the second page is designated as the local page in step 260 of FIGS. 5 and 6. Another example of using historical frequency-of-use data, for websites visited in the past by at least one user of said websites, is using such historical frequency-of-use data for determining the desired page of the website in relation to step 320 of FIGS. 7 and 8, wherein the desired page is designated as the global page in step 330 of FIGS. 7 and 8. User communication with the applicable browser or other software can be accomplished by any physical mechanism known to one of ordinary skill in the art such as by use of: multiple clicking of a mouse via left, middle or right button, or a combination thereof; a keyboard; a touch pad, etc.

Figure 9:
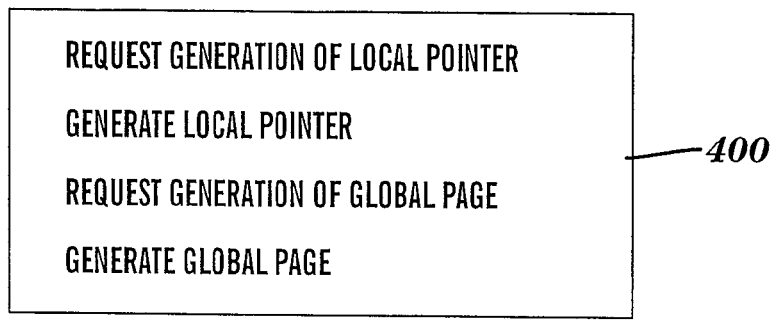
FIG. 9 is a pop-up menu for generating a local pointer or a global page, in accordance with embodiments of the present invention.
Figure 10:
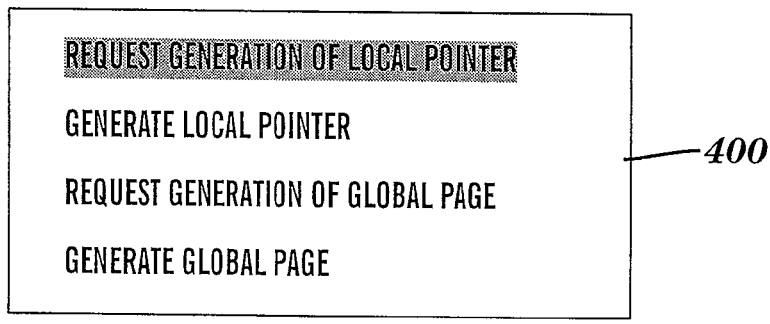
FIG. 10 depicts the pop-up menu of FIG. 9 with a first menu choice highlighted, in accordance with embodiments of the present invention.
Figure 11:
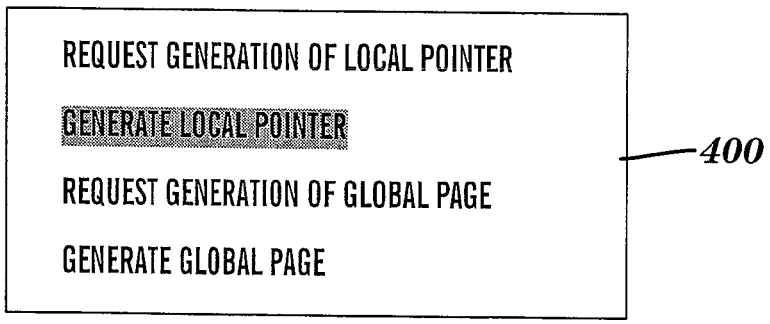
FIG. 11 depicts the pop-up menu of FIG. 9 with a second menu choice highlighted, in accordance with embodiments of the present invention.
Figure 12:
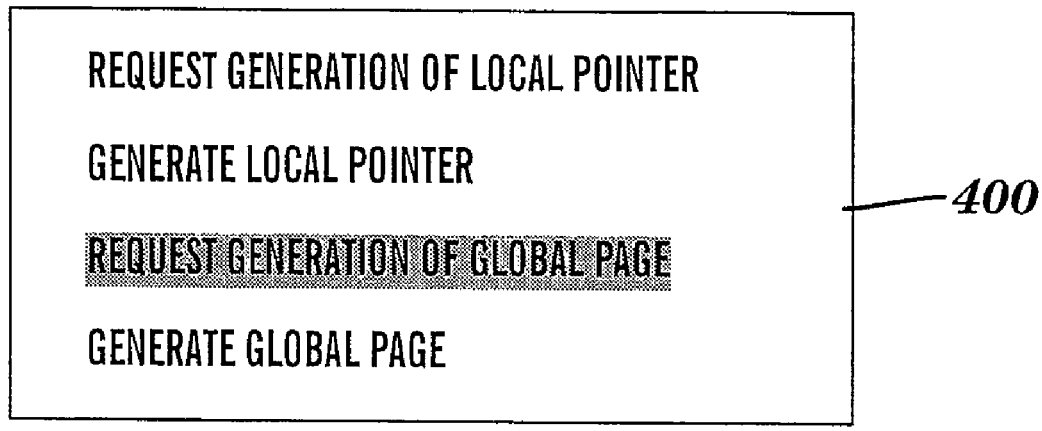
FIG. 12 depicts the pop-up menu of FIG. 9 with a third menu choice highlighted, in accordance with embodiments of the present invention.
Figure 13:
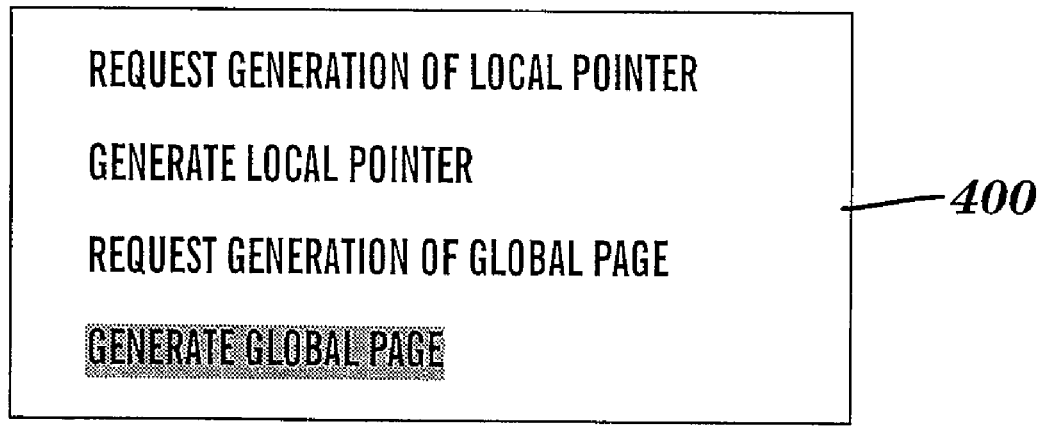
FIG. 13 depicts the pop-up menu of FIG. 9 with a fourth menu choice highlighted, in accordance with embodiments of the present invention.

As an example of such an applicable method implementing such choices and commands, FIG. 9 is a pop-up menu for generating a local pointer or a global page, in accordance with embodiments of the present invention. FIG. 9 includes a first menu choice ("Request generation of local pointer"); a second menu choice ("Generate local pointer"); a third menu choice ("Request generation of global page"); and a fourth menu choice ("Generate global page"). FIG. 10 depicts the pop-up menu of FIG. 9 with the first menu choice highlighted, in accordance with embodiments of the present invention. FIG. 11 depicts the pop-up menu of FIG. 9 with the second menu choice highlighted, in accordance with embodiments of the present invention. FIG. 12 depicts the pop-up menu of FIG. 9 with the third menu choice highlighted, in accordance with embodiments of the present invention. FIG. 13 depicts the pop-up menu of FIG. 9 with the fourth menu choice highlighted, in accordance with embodiments of the present invention.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A global link structure, comprising:
 a global page of a first website, wherein said global page is the only global page within the global link structure, wherein all global pointers within the global link structure must point to said global page, and wherein a plurality of global pointers exist within the global link structure;
 a first page of the first website, wherein the first page includes a first link, wherein the first link includes a first default pointer and a first global pointer, wherein the first default pointer points to a first default page, and wherein the first global pointer points to the global page,
 said global link structure stored on computer readable physically tangible storage media.

2. The global link structure of claim 1, wherein the first page further includes a second link, wherein the second link includes a second default pointer and a second global pointer, wherein the second default pointer points to a second default page, and wherein the second global pointer points to the global page.

3. The global link structure of claim 1, wherein the first page further includes a second link, wherein the second link includes a second default pointer, wherein the second default pointer points to a second default page, and wherein the second link does not include the global pointer.

4. The global link structure of claim 1, further comprising a second page of the first website, wherein the second page includes a second link, wherein the second link includes a second default pointer and a second global pointer, wherein the second default pointer points to a second default page, and wherein the second global pointer points to the global page.

5. The global link structure of claim 1, further comprising a second page of the first website, wherein the second page includes a second link, wherein the second link includes a second default pointer, wherein the second default pointer points to a second default page, and wherein the second link does not include the global pointer.

6. The global link structure of claim 1, wherein the first website includes the first default page.

7. The global link structure of claim 1, wherein a second website includes the first default page.

8. A hybrid link structure, comprising:
 a global page of a first website, wherein said global page is the only global page within the hybrid link structure, wherein all global pointers within the hybrid link structure must point to said global page, and wherein a plurality of global pointers exist within the hybrid link structure; and
 a first page of the first website, wherein the first page includes a first link, wherein the first link includes a first default pointer, a first local pointer, and a first global pointer, wherein the first default pointer points to a first default page, wherein the first local pointer points to a first local page of the first website, and wherein the first global pointer points to the global page,
 said hybrid link structure stored on computer readable physically tangible storage media.

9. The hybrid link structure of claim 8, wherein the first page further includes a second link, wherein the second link includes a second default pointer, a second local pointer, and a second global pointer, wherein the second default pointer points to a second default page, wherein the second local pointer points to a second local page of the first website, and wherein the second global pointer points to the global page.

10. The hybrid link structure of claim 8, wherein the first page further includes a second link, wherein the second link includes a second default pointer and a second global pointer, wherein the second default pointer points to a second default page, wherein the second global pointer points to the global page, and wherein the second link does not include a local pointer.

11. The hybrid link structure of claim 8, wherein the first page further includes a second link, wherein the second link includes a second default pointer and a second local pointer, wherein the second default pointer points to a second default page, wherein the second local pointer points to a second local page of the first website, and wherein the second link does not include the global pointer.

12. The hybrid link structure of claim 8, further comprising a second page of the first website, wherein the second page includes a second link, wherein the second link includes a second default pointer, a second local pointer, and a second global pointer, wherein the second default pointer points to a second default page, wherein the second local pointer points to a second local page of the first website, and wherein the second global pointer points to the global page.

13. The hybrid link structure of claim 8, further comprising a second page of the first website, wherein the second page includes a second link, wherein the second link includes a second default pointer and a second global pointer, wherein the second default pointer points to a second default page, wherein the second global pointer points to the global page, and wherein the second link does not include a local pointer.

14. The hybrid link structure of claim 8, further comprising a second page of the first website, wherein the second page includes a second link, wherein the second link includes a second default pointer and a second local pointer, wherein the second default pointer points to a second default page, wherein the second local pointer points to a second local page of the first website, and wherein the second link does not include the global pointer.

15. The hybrid link structure of claim 8, wherein the first website includes the first default page.

16. The hybrid link structure of claim 8, wherein a second Internet website includes the first default page.

17. A method for linking within a website, comprising:
providing a global link structure, wherein the global link structure includes a global page of the website and a first page of the website, wherein said global page is the only global page within the global link structure, wherein all global pointers within the global link structure must point to said global page, and wherein a plurality of global pointers exist within the global link structure, wherein the first page includes a first link, wherein the first link includes a first default pointer and a first global pointer, wherein the first default pointer points to a first default page, and wherein the first global pointer points to the global page; and
linking from the first link to the global page through the first global pointer, wherein said linking is performed by a computer.

18. The method of claim 17, wherein the first page further includes a second link, wherein the second link includes a second default pointer and a second global pointer, wherein the second default pointer points to a second default page, wherein the second global pointer points to the global page, and wherein the method further comprises:
navigating from the global page to the first page; and
linking from the second link to the global page through the second global pointer.

19. The method of claim 17, wherein the global link structure further comprises a second page of the website, wherein the second page includes a second link, wherein the second link includes a second default pointer and a second global pointer, wherein the second default pointer points to a second default page, wherein the second global pointer points to the global page, and wherein the method further comprises:
navigating from the global page to the second page; and
linking from the second link to the global page through the second global pointer.

20. The method of claim 19, wherein said providing the global link structure comprises:
requesting generation of the global page of the website;
navigating to a desired page of the website;
designating the desired page as the global page of the website;
navigating to the first page of the website;
moving a cursor to the first link on the first page, wherein the first link on the first page includes the first default pointer to the first default page;
generating the first global pointer to the global page at the link on the first page;
navigating to the second page of the website;
moving the cursor to the second link on the second page, wherein the second link on the second page includes the second default pointer to the second default page; and
generating the second global pointer to the global page at the link on the second page.

21. A method for linking within a website, comprising:
providing a hybrid link structure, wherein the hybrid link structure comprises a global page of the website and a first page of the website, wherein said global page is the only global page within the hybrid link structure, wherein all global pointers within the hybrid link structure must point to said global page, and wherein a plurality of global pointers exist within the hybrid link structure, wherein the first page includes a first link, wherein the first link includes a first default pointer, a first local pointer, and a first global pointer, wherein the first default pointer points to a first default page, wherein the first local pointer points to a first local page of the website, wherein the first global pointer points to the global page; and
first linking selected from the group consisting of linking from the first link to the first local page through the first local pointer and linking from the first link to the global page through the first global pointer, wherein said first linking is performed by a computer.

22. The method of claim 21, wherein the first linking consists of linking from the first link to the first local page through the first local pointer.

23. The method of claim 22, wherein the first page further includes a second link, wherein the second link includes a second default pointer, a second local pointer, and a second global pointer, wherein the second default pointer points to a second default page, wherein the second local pointer points to a second local page of the website, and wherein the second global pointer points to the global page, and wherein the method further comprises:
navigating from the first local page to the first page; and
second linking selected from the group consisting of linking from the second link to the second local page through the second local pointer and linking from the second link to the global page through the second global pointer.

24. The method of claim 22, wherein the hybrid link structure further comprises a second page of the website, wherein the second page includes a second link, wherein the second link includes a second default pointer, a second local pointer, and a second global pointer, wherein the second default pointer points to a second default page, wherein the second local pointer points to a second local page of the website, and wherein the second global pointer points to the global page, and wherein the method further comprises:
navigating from the first local page to the second page; and
second linking selected from the group consisting of linking from the second link to the second local page through the second local pointer and linking from the second link to the global page through the second global pointer.

25. The method of claim 21, wherein the first linking consists of linking from the first link to the global page through the first global pointer.

26. The method of claim 25, wherein the first page further includes a second link, wherein the second link includes a second default pointer, a second local pointer, and a second global pointer, wherein the second default pointer points to a second default page, wherein the second local pointer points to a second local page of the website, and wherein the second global pointer points to the global page, and wherein the method further comprises:
   navigating from the global page to the first page; and
   second linking selected from the group consisting of linking from the second link to the second local page through the second local pointer and linking from the second link to the global page through the second global pointer.

27. The method of claim 25, wherein the hybrid link structure further comprises a second page of the website, wherein the second page includes a second link, wherein the second link includes a second default pointer, a second local pointer, and a second global pointer, wherein the second default pointer points to a second default page, wherein the second local pointer points to a second local page of the website, and wherein the second global pointer points to the global page, and wherein the method further comprises:
   navigating from the global page to the second page; and
   second linking selected from the group consisting of linking from the second link to the second local page through the second local pointer and linking from the second link to the global page through the second global pointer.

\* \* \* \* \*